United States Patent [19]

Doan

[11] Patent Number: 4,930,964
[45] Date of Patent: Jun. 5, 1990

[54] HAY LOADER

[76] Inventor: John P. Doan, 213 Comanche, Tulia, Tex. 79088

[21] Appl. No.: 290,561

[22] Filed: Dec. 27, 1988

[51] Int. Cl.⁵ .................... A01D 90/08; A01D 87/12; B60P 1/04; B65G 67/02
[52] U.S. Cl. ................... 414/24.5; 414/437; 414/469; 414/482; 414/546; 414/551; 414/721; 414/786; 414/911
[58] Field of Search ............. 414/24.5, 911, 721, 414/437, 436, 469, 482, 486, 487, 546, 551, 554, 338, 786

[56] References Cited

U.S. PATENT DOCUMENTS

| | | | |
|---|---|---|---|
| 871,601 | 11/1907 | Lauppe | 414/437 |
| 2,033,243 | 3/1936 | Jester | 414/546 |
| 2,792,134 | 5/1957 | Kinnee | 414/546 |
| 3,941,265 | 3/1976 | Nunnally | 414/482 |
| 4,056,204 | 11/1977 | Spasuik | 414/551 |
| 4,089,425 | 5/1978 | Baltz | 414/24.5 |
| 4,182,590 | 1/1980 | Harkness | 414/24.5 |
| 4,268,199 | 5/1987 | Frontrier | 414/551 |
| 4,326,827 | 4/1982 | McNutt | 414/24.5 |
| 4,573,845 | 3/1987 | Carpenter | 414/24.5 |
| 4,687,402 | 8/1987 | Zatylny | 414/24.5 |

FOREIGN PATENT DOCUMENTS

| | | | |
|---|---|---|---|
| 1011297 | 5/1977 | Canada | 414/24.5 |
| 806328 | 12/1958 | United Kingdom | 414/436 |
| 1588358 | 4/1981 | United Kingdom | 414/24.5 |

Primary Examiner—David H. Brown
Attorney, Agent, or Firm—Wendell Coffee

[57] ABSTRACT

A self-loading transport for round hay includes at tilt platform hinged to a transport platform. Round bales of hay are captured onto the tilt platform when it is in an upright position. Then, movement of the transport forward will raise and level the tilt platform with a bale of hay on it. When the tilt platform is in its full erect position, the bale of hay will roll forward from the tilt platform onto the transport platform. A rocker on the tilt platform aids in the smooth motion of the tilt platform and the rear of the transport platform from the transport position to a tilt position with a tilt platform in upright position. When the bales have been transported to the desired location, they are unloaded from the transport by permitting individual trays carrying the bales in transport on the transport platform to rotate upon the transport frame.

20 Claims, 4 Drawing Sheets

HAY LOADER

BACKGROUND OF THE INVENTION (1) Field of the Invention

This invention relates to the handling of round bales of hay, and more particularly to loading them from the ground and transporting them to a remote location. A farmer or rancher is one having ordinary skill in this art.

(2) Description of the Related Art

In recent years, round bales for hay have become popular. Perhaps over half the hay baled is now baled in round bales. Despite many advantages of making round bales, the handling of round bales presents problems. Many solutions have been proposed for handling round bales of hay.

One of the solutions has been a tilting carrier. Examples of tilting carriers include:

| Inventor | Patent Number | Issue Date |
| --- | --- | --- |
| ROWE | 3,938,682 | 02/17/76 |
| KANNADY ET AL | 3,985,253 | 10/12/76 |
| ARMSTRONG | 4,084,711 | 04/18/78 |
| BALTZ | 4,089,425 | 05/15/78 |
| BROWN | 3,944,095 | 03/16/76 |

ROWE, KANNADY, ARMSTRONG, and BALTZ all show cradles or the like which are mounted upon ground engaging wheels. When the brake on the ground engaging wheels is locked, the pickup is moved backwards, the rear of the cradle engages the ground, and the cradle is moved to an upright position adjacent to the bale. The bale is then captured onto the cradle by spikes on the end of arms, loops on the end of arms, chains, or the like. Then when the pickup moves forward, the platform is brought to a level position elevated above the ground with the bale of hay restrained thereon.

The bale is carried to a remote location in the cradle. It is noted that applicant has used the term cradle to describe how the bale is carried, although it might be noted that in ARMSTRONG, it is carried on a platform rather than a cradle.

BROWN discloses a device with a winch and a bridle for rolling a round bale of hay onto a platform which is tilted sufficiently so that the bale of hay can be rolled up the incline by the winch.

Each of the devices carries one bale of hay and represents the device for easily loading and carrying one bale of hay and unloading one bale of hay.

SUMMARY OF THE INVENTION (1) Progressive Contribution to the Art

I have invented a transport wherein at least three or four bales of hay can be loaded with a tilting platform with ease of the previous cradle devices which were known before this invention.

I have used a tilting cradle or platform to raise a bale of hay to an elevation sufficiently high that it may be rolled upon the bed or platform of a flat bed trailer. In this way, after each bale is lifted from the ground by a tilting mechanism resembling previously described tilting cradle patent described above, it is rolled, onto the sloping platform of the trailer. The first bale loaded rolls to the front of the trailer, and each succeeding bale rolls forward until it is adjacent to the bale in front of it.

The embodiment illustrated in the drawings of this invention has three bales on the trailer, and after three bales have been loaded on the trailer, one additional bale can be carried on the tilt platform. Thus, I have provided a loading and transport mechanism which does not require precision machine work or complex lifting mechanism, but which uses the same principle as the rugged tilting cradles known to the prior art.

(2) Objects of this Invention

An object of this invention is to load round bales of hay upon a transport vehicle, transport them to a remote location, and unload the bales of hay at the remote location.

Further objects are to achieve the above that are sturdy, compact, durable, lightweight, simple, safe, efficient, versatile, ecologically compatible, energy conserving, and reliable, yet inexpensive and easy to manufacture, connect, adjust, operate and maintain.

Other objects are to achieve the above with a method that is rapid, versatile, ecologically compatible, energy conserving, efficient, and inexpensive, and does not require highly skilled people to connect, adjust, operate, and maintain.

The specific nature of the invention, as well as other objects, uses, and advantages thereof, will clearly appear from the following description and from the accompanying drawing, the different views of which are not scale drawings.

Figure 1:
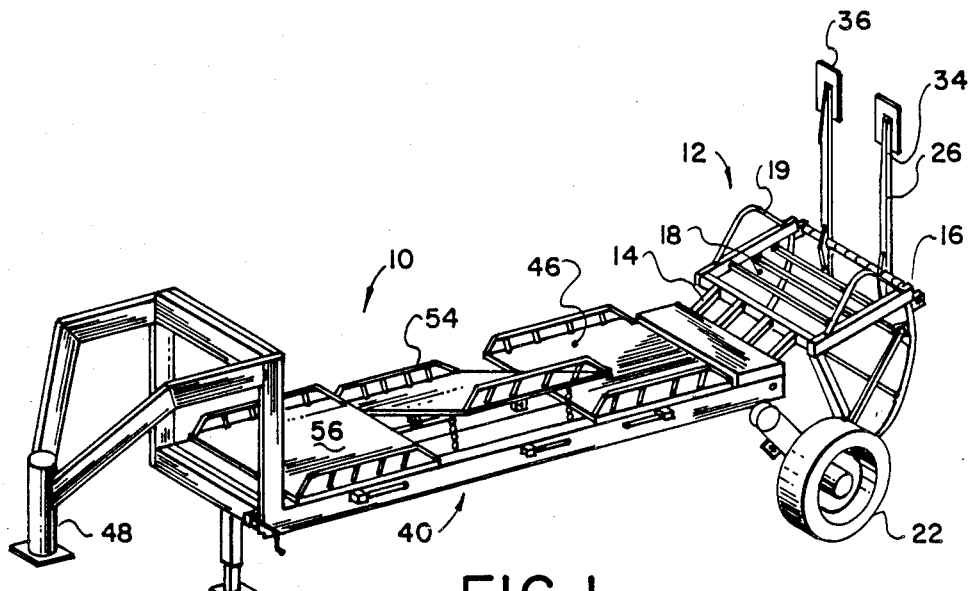
FIG. 1 is a perspective view of an embodiment of this invention.

As an aid to correlating the terms of the claims to the exemplary drawing, the following catalog of elements and steps is provided:

10 transport
12 tilt platform
14 front hinge end
16 back end
18 tilt surface
19 rim
20 struts 21 axle
22 wheels
23 strut ears
24 remote control brakes
26 bale capturing arm
27 pitman
28 rocker
30 spiker
32 arm ears
33 lower leg
34 distal end
35 cross brace
36 skid plates
37 restraining chain
40 transport platform
41 transport frame
42 rear hinge end
43 block
44 front tow end
46 transport surface
48 hitch
50 hinge
51 transport brace
52 pickup
54 rim
56 trays
58 frame beams
60 latch
62 tray ears
B bale

DESCRIPTION OF THE PREFERRED EMBODIMENT:

Referring to the drawings, there may be seen an embodiment of self-loading transport 10 according to this invention.

Tilt platform 12 has a front end which is referred to as a front hinge end 14. Also, the tilt platform has back end 16. Tilt surface 18 is the top surface from the hinge to back end. The tilt length is the distance from the front hinge end to the back end. Wheel struts 20 are pivotally attached to the self-loading transport 10 near the front hinge end 14 of said tilt platform. Ground engaging wheels 22 are journaled to said wheel struts. Remote control brakes 24 (FIGS. 8 and 9) are a means for locking the ground engaging wheel. A pair of bale capturing arms 26 are attached to the tilt platform.

Those having ordinary skill in the art will recognize that the invention as described to this point resemble the prior art devices described in the ROWE, KANNADY ET AL, ARMSTRONG, and BALTZ patents identified above. It will be understood that there is a wide range of equivalents for many of the parts, e.g., many different types of brakes could be used as well as many different types of bale capturing arms. The bale capturing arms form a means for capturing the bale of hay and restraining it on the platform. In this regard, the flexible member 32 of ARMSTRONG is a means for capturing the bale and restraining it on the platform. The spikes on the end of the arm or the loop on the end of the arm as shown in the prior art are also means for capturing the bale and restraining it on the platform.

Specifically describing the embodiment of the invention shown, the struts 20 are rigidly connected as by welding to axle 21 which is journaled in strut ears 23 attached to transport frame 41 of transport platform 40. The struts are connected to the tilt platform 12 by pitman 27.

The pitman connects the struts to the tilt platform so that the tilt platform and the struts pivot together. I.e., referring to FIG. 2, when the struts and the wheels are in the rear position, the tilt platform also is the rear position, but referring to FIGS. 4 and 5, when the struts are in the collapsed or tilt position, the tilt platform 12 will also be in the upright or tilt position. Arcuate rocker 28 is attached to the tilt frame 12. The arcuate rocker extends from near the struts 20 rearwardly to the back end 16. Ground engaging spike 30 is mounted upon the rocker near the strut 20.

Figure 10:
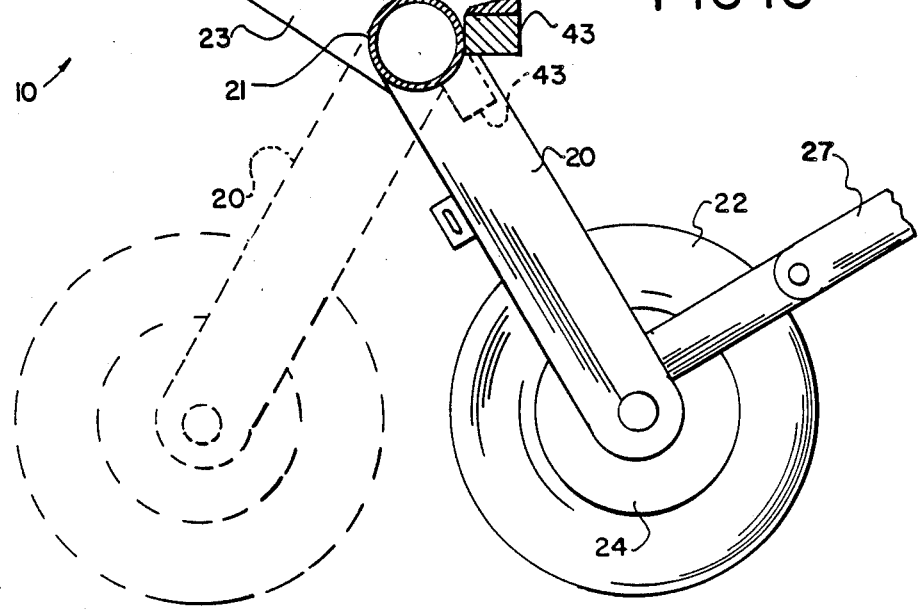
FIG. 10 is a sectional view taken substantially on line 10—10 of FIG. 9 showing the rear wheels and one of the struts thereon.

Referring to FIG. 10, block 43 is attached to the axle 21 as by welding. When the struts 20 are in the rear position as seen in full line in FIG. 10, the blocks 43 engage a portion of the transport frame 41 preventing further counter clockwise rotation of the axle and struts.

Analysis of the equipment shown will indicate that when the ground engaging wheels 22 are locked by the brakes 28 and the self-loading transport 10 is moved rearwardly, that the rearward movement of the ears 23 will rotate the struts 20 and bring the strut ears 23 upward. This is necessary for the stability of the equipment and to prevent the wheels from collapsing forward. With further rearward movement, the rocker 28 does not permit the strut ears 23 to move downward drastically. The ears 23 will be maintained at near the same height, and if there is a change in elevation because the center of curvature of arcuate rocker 28 is not at the hinge 50, this change in elevation will be gradual and gentle.

Figure 2:
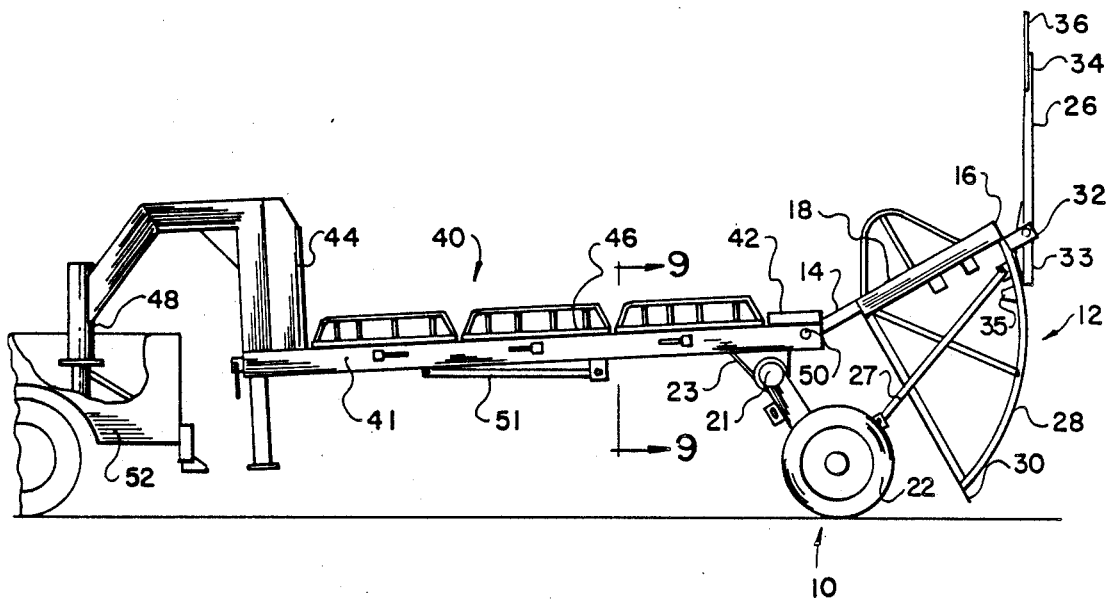
FIG. 2 is a side elevational view of the embodiment shown in FIG. 1 shown attached to a pickup.
Figure 7:
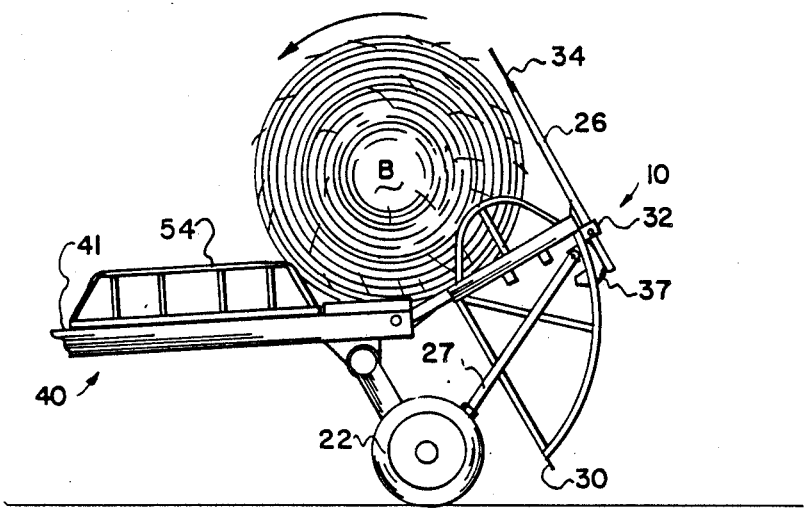
FIG. 7 is a side elevational view similar to FIG. 2 with the bale of hay released from the restraints and with the tilt platform sloping toward the transport platform and the bale of hay rolling from the tilt platform onto the transport platform.

The tilt platform 12 has two sides extending from the back end 16 to the hinge end 14. Arm ears 32 extend rearward from near each side upon the back end (FIGS. 2 and 7). One of the arms 26 is pivoted to the arm ears 32 near the side. Skid plate 36 is attached to each of the distal ends 34 of the capture arms 26 to slide under a bale B of hay prior to capturing the bale upon the tilt platform 12.

Transport platform 40 includes rear hinge end 42 and a front tow end 44. Transport surface 46 extends from the rear hinge end 42 to the front tow end 44. The transport length of the transport surface is about three times the tilt length of the tilt surface 18. This length may vary but to provide an efficient transport, it will always be longer than the tilt length, and it is preferred that it be at least twice as long.

Towing hitch 48 is attached to the transport platform 40 at the front tow end 44. As shown in the drawing, it is that type of hitch known as a goose-neck hitch extending into the bed of pickup 52. However, those having skill in the art will understand that other type hitches could be used in other circumstances.

Hinge 50 is connected at the rear hinge end 42 of the transport platform and the front hinge end 14 of the tilt platform 12. The hinge 50 is so constructed that the tilt surface 18 is at the same level as the transport surface 46. By being at the same level, it is understood to mean that the top surface is at the same level. Also, the hinge is such that the slope of the tilt platform 12 is greater than the slope of the transport platform 40.

It will be seen in the drawings that because of the construction of the hitch 48 and of the ground engaging wheels 22 and their strusts 20, that the rear hinge end 42 of the transport platform 40 is higher than the front tow end 44. Therefore, the transport surface 46 slopes from the back downward toward the front. Also, the elements are so constructed that the upper surfaces form an angle so that the tilt surface 18 has a greater slope than the transport surface 46.

Figure 8:
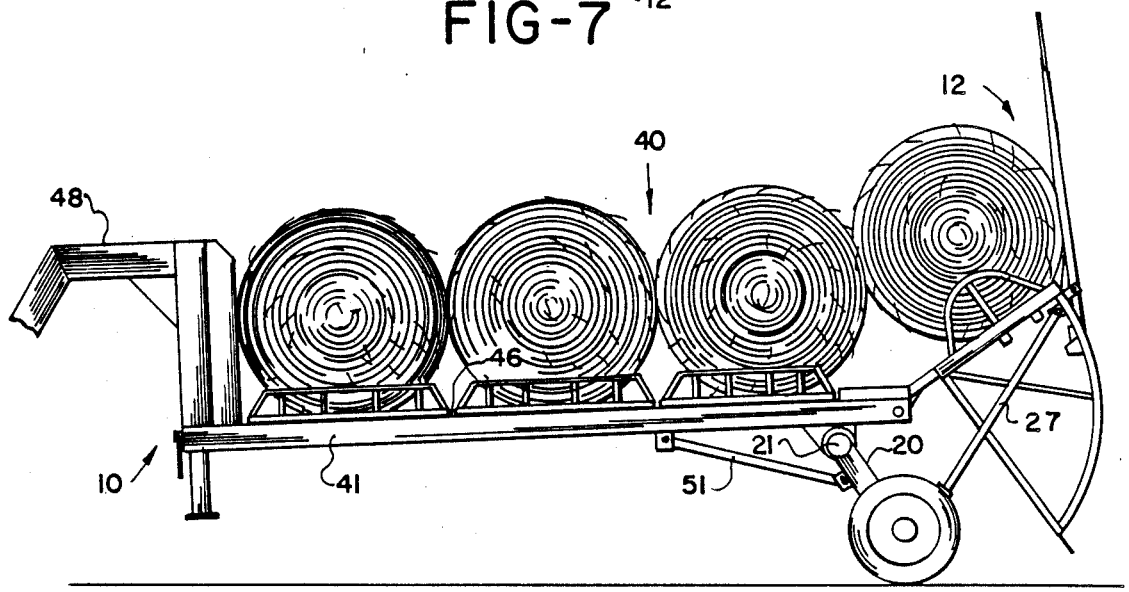
FIG. 8 is a side elevational view similar to FIG. 2 showing three bales of hay upon the transport platform and one bale of hay loaded on the tilt platform.
Figure 9:
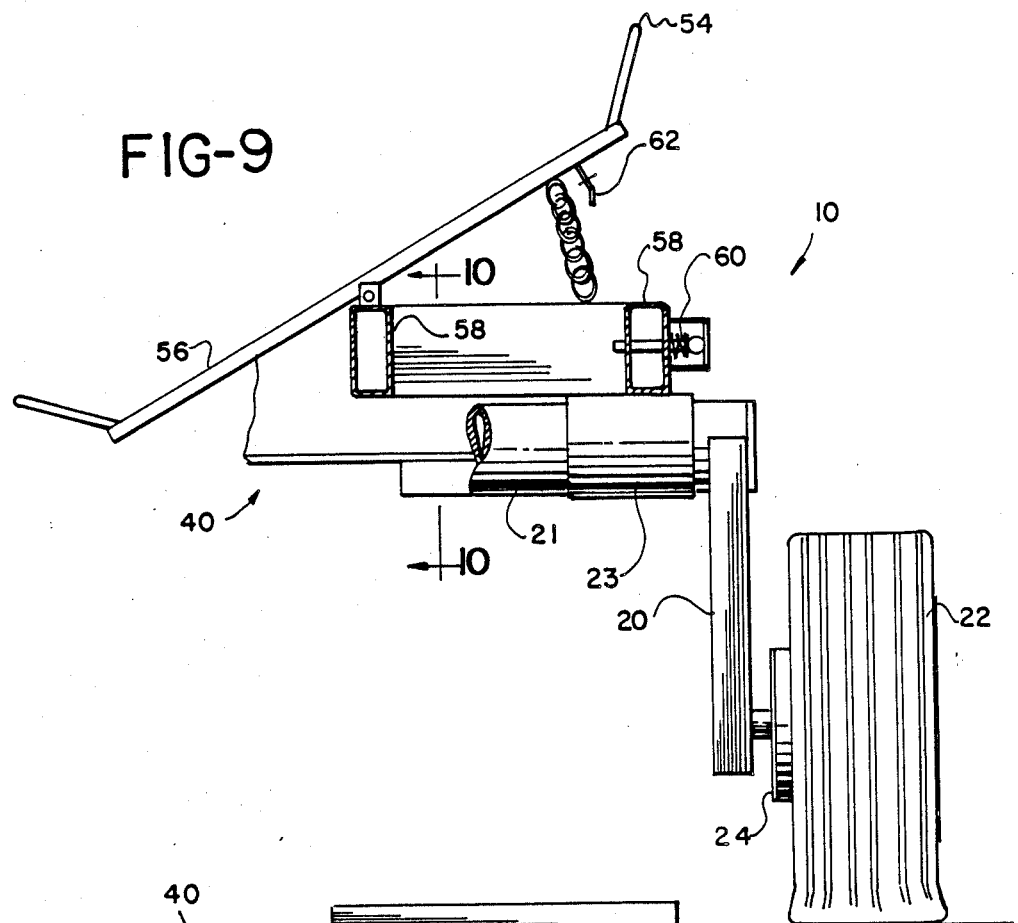
FIG. 9 is a sectional view taken substantially on line 9—9 of FIG. 2 showing the frame of the transport platform with a tray in the unloading position.

The self loading transport 10 will have two positions. One is the transport position when the ground engaging wheels 22 are rearward of the axle 21 and the transport 10 can be readily moved from one location to another whether it is loaded with bales of hay or not. When in the transport position and also when actually moving from one location to a remote location, it is desirable to have transport brace 51 in place extending from the frame 41 of the transport platform to the strut 20 as shown in FIG. 8. When it is not actually used in transport, but being moved from one bale of hay to another where the bales are being picked up off the ground, the transport brace 51 is moved forward and attached along the bottom of the transport frame 41 (FIG. 2).

Figure 4:
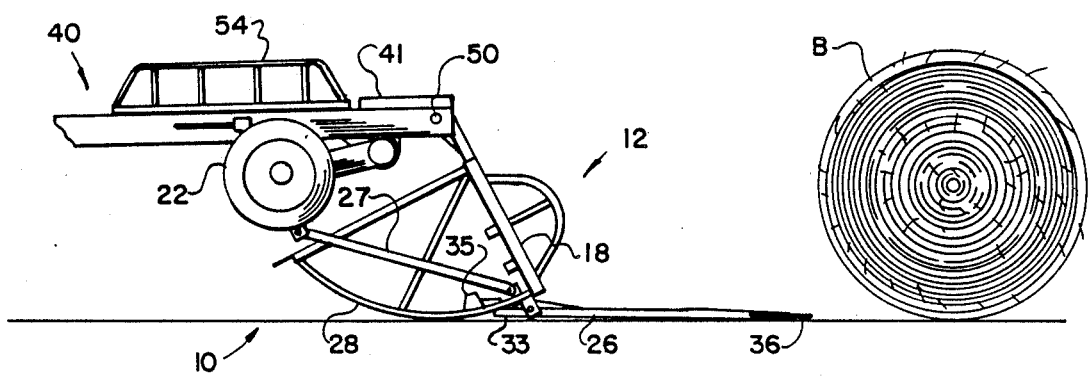
FIG. 4 is a side elevational view of the rear portion according to FIG. 2 with the tilting platform in the upright position and the capture fork flat on the ground.
Figure 5:
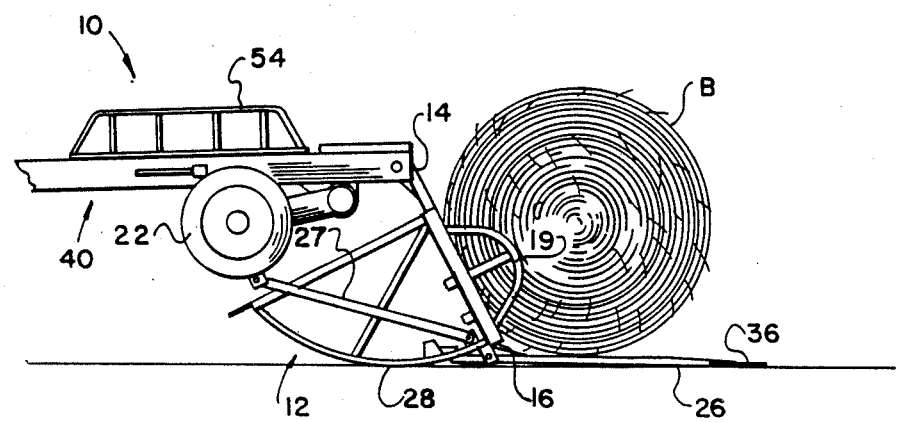
FIG. 5 is a side elevational view of the rear end similar to FIG. 2 with the capture fork under the bale.

Another position of the self-loading transport 10 will be the upright tilt position when the tilt platform is upright, i.e., vertical or nearly so as seen in FIGS. 4 and 5.

It will be understood that the transport platform is supported at the front end by the towing hitch and the rear end by the axle 21.

Operation

Figure 3:
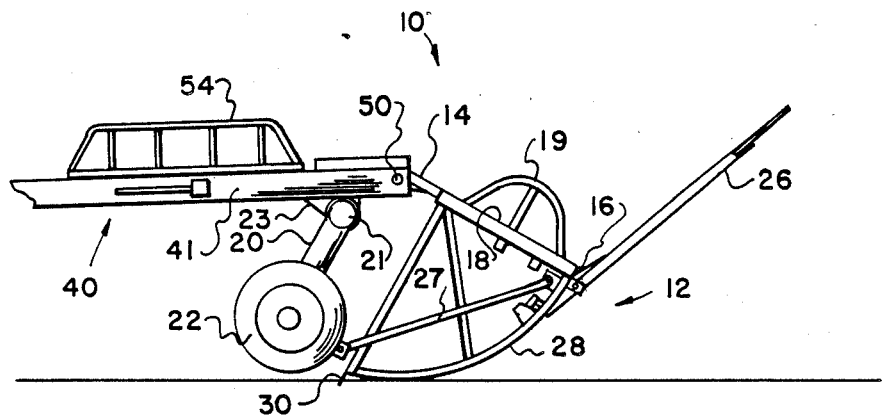
FIG. 3 is a side elevational view of the rear end of the embodiment shown in FIG. 2, as it is being backed with the tilting platform being tilted.

To operate the transport 10, the hitch 48 is connected to a towing vehicle such as pickup 52. Then the transport is moved to a location of the round bale B of hay upon the ground. With the transport 10 in the transport position (FIG. 2) the unit will be backed so that the back end 16 is close to the round bale B of hay. At that point, the brakes 24 are actuated so that further rearward movement of the pickup 52 and transport 10 causes the tilt platform 12 to rotate about the hinge 50 (FIG. 3). As soon as the wheels 22 pass dead center under the axle 21, the tilt platform 12 will be supported by the rocker 28. The spikes 30 on the rocker 28 will prohibit sliding of the unit.

Figure 6:
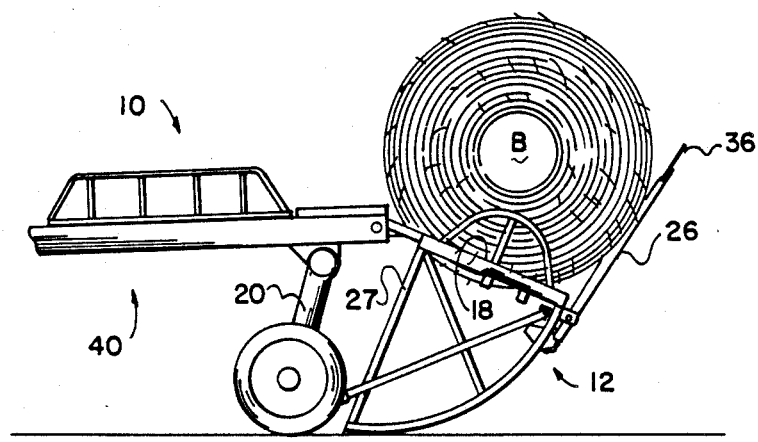
FIG. 6 is a side elevational view of the rear portion similar to FIG. 2 as the tilting platform is being raised and leveled with the bale of hay restrained thereon.

Further rearward movement will move the tilt platform 12 to an upright position with the skid plates 36 adjacent to the round bale on the ground (FIG. 4). At this time, further rearward movement will cause the skids 36 to extend under the round bale B, and also the capturing arms 26 will extend under the round bale B until the round bale B comes onto the tilt surface 18 of the tilt platform 16 (FIG. 5). At this point, the bale B is captured upon the tilt platform 12. This is particularly seen in FIG. 6 because the forward movement will cradle the bale B between the surface 18 and the capture arms 26. Thereupon, forward movement of the pickup 52 and the transport 10 will raise and level the tilt platform 12 with the round bales restrained thereon. Further forward motion will further tilt the tilt platform until it slopes toward the transport platform 40 (FIG. 7). The bale capture arms 26 no longer restrain the bale, i.e., they release the bale from the tilt platform. The round bale will roll forward from the tilt platform onto the transport platform 40.

The tilt platform has a steeper slope as described above so that this initial rolling movement commences. It will be understood that the shaking and the movement of the bale in the loading and tilting process may tend to settle it upon the tilt platform 12; and therefore, a certain steeper slope is necessary to start it rolling at this point. However, once it begins rolling, the slope need not be so steep for it to continue to roll along the transport surface 46. It will continue to roll until it is stopped, either by obstructions at the front tow end 44 of the transport platform 40 or by another bale of hay, if the bale B is not the first bale loaded.

As soon as the bale is loaded, the transport 10 may be moved by the pickup 52 to another bale of hay, and the process of loading repeated. Those having skill in the art will understand that although round bales of hay are reasonably secure, they still are sometimes damaged by excessive rough handling. The rocker 28 provides a minimum of downward and upward movement of the hinge 50; and therefore, of the rear hinge end 42 of the transport platform 40; therefore, not shaking the bales of hay loaded upon the transport platform 40 excessively.

Also, the tilt surface 18 the transport surface 46 being the same level at the hinge, prevents damage to the bale as it rolls along this smooth surface. As soon as the transport platform 40 is loaded, one additional bale can be loaded and retained on the tilt platform if desired. Then the fully loaded transport 10 may be used in transporting the hay to a location remote from where loaded and the hay unloaded from the transport platform.

It will be noted that the edges of the transport platform 40 from the front tow end 44 to the rear hinge end 42 are angled upward to form a retaining rim 54 for retaining the round bales on the transport platform. The tilt surface 18 also has an upward angled rim 19 on each of its sides.

To unload the bales, it is preferred that the transport platform 40 be formed include a series of trays 56 (FIGS. 1 and 9) journaled to frame beams 58. Normally, the trays are latched in position to tray ears 62 by latch 60 mounted upon the frame beams 58. By releasing the latch 60, the trays 56 will rotate to dump the bale from the transport platform 40. After the bale is dumped, the tray 56 may be returned to its position for loading additional bales thereon.

From the description of the operation, it will be noted that the capture arms 26 function somewhat similar to the fork of a forklift warehouse truck. However, inasmuch as these lift arms operate in rough field conditions, it is necessary to have them pivoted at the arm ears 32. However, because they are attached to the tilt frame and the arms basically rotate from a horizontal position to an upright position, it is necessary this tilting be limited. For this reason, the tilt arms extend below the arm ears with a lower leg 33 which bumps against one of the cross braces 35 of the rocker 28 (FIGS. 2 and 4). However, to prevent it from falling forward when the tilt platform is in its upper position, a restraining chain 37 limits rotation.

The embodiment shown and described above is only exemplary. I do not claim to have invented all the parts, elements or steps described. Various modifications can be made in the construction, material, arrangement, and operation, and still be within the scope of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

The skid plates 36 prevent the capture arms 26 from digging in the ground and from digging in the hay while the arms are going under the bale as in FIGS. 4 and 5.

I claim as my invention:

1. On a loader for round hay bales having:
   a. a tilt platform having i. a front hinge end opposite
ii. an back end,
b. a towing hitch,
c. rigid structure extending from the towing hitch to said front hinge end of said tilting platform,
d. a tilt hinge connecting said rigid structure to said front hinge end of the tilt platform,
e. a means for capturing a bale of hay connected to the tilt platform,
f. wheel struts mounted on the loader,
g. ground engaging wheels journaled to said wheel struts, and
h. remote control brake for said wheels,
the improved structure comprising in combination:
j. an arcuate rocker attached to the tilt platform,
k. said arcuate rocker extending from near the wheel struts to the back end of the tilt platform.

2. A self-loading transport for round hay bales comprising:
a. a tilt platform having
  i. a front hinge end opposite
  ii. a back end,
  iii. a tilt platform surface extending from the front hinge end to the back end, and
  iv. a tilt length between the hinge end and back end,
b. a means for capturing a bale of hay connected to the tilt platform,
c. a transport platform having
  i. a rear hinge end opposite
  ii. a front tow end, and
  iii. a transport surface extending from the front tow end to rear hinge end, and
  iv. a transport length between the hinge end and tow end, which is
  v. at least twice as long as the tilt length,
d. a towing hitch on the transport platform at the front tow end, and
a tilt hinge connecting the tilt platform hinge end to the transport platform hinge end, so that the self-loading transport has two positions called
  i. the transport position and
  ii. the upright tilt position,
f. wheel struts pivotably mounted to said self-loading transport near the rear end of the transport platform,
g. said struts connected to said tilt platform so that they pivot together,
h. ground engaging wheels journaled to said wheel struts,
j. remote controlled brakes for said wheels,
k. wherein said transport is so constructed and arranged that the transport platform is supported with the rear above the front thus sloping the transport surface down toward the front hitch end.

3. The invention as defined in claim 2 further comprising:
l. said tilt surface and transport surface are at the same level at the tilt hinge.

4. The invention as defined in claim 2 further comprising:
l. the tilt platform in the transport position sloping down from the back end at a steeper slope than the transport platform.

5. The invention as defined in claim 2 further comprising:
l. said towing hitch in the form of a goose neck hitch.

6. The invention as defined in claim 2 further comprising:
l. a transport brace extending from each of the struts to the transport platform in the transport position, and
m. a tilt pitman extending from each of the struts to the rocker near the back end of the tilt platform.

7. The invention as defined in claim 2 further comprising:
l. a frame on said transport platform,
m. at least two trays forming the transport surface,
n. said trays pivoted to the frame, and
o. a latch holding the trays at level position.

8. The invention as defined in claim 2 further comprising:
l. an arcuate rocker attached to the tilt platform,
m. said arcuate rocker extending from near the wheel carrying struts to the back end.

9. The invention as defined in claim 8 further comprising:
n. a ground engaging spike mounted on the rocker near the struts.

10. The invention as defined in claim 2 further comprising:
l. said means for capturing in the form of a fork extending away from the tilt surface at the back end of the tilt platform.

11. The invention as defined in claim 10 further comprising:
m. said fork pivoted to said tilt platform, and
n. limit means interconnecting the fork and tilt platform for limiting the pivotable movement of the fork.

12. A self-loading transport for round hay bales comprising:
a. a tilt platform having
  i. a front hinge end opposite
  ii. a back end,
  iii. a tilt platform surface extending from the front hinge end to the back end, and
  iv. a tilt length between the hinge end and back end,
b. a bale capture arm in the form of a fork pivotably connected to the tilt platform,
c. said fork extending away from the tilt surface at the back end of the tilt platform,
d. limit means innerconnecting the fork and the tilt platform for limiting the pivotal movement of the fork,
e. a transport platform having
  i. a rear hinge end opposite
  ii. a front tow end, and
  iii. a platform surface extending from the front tow end to rear hinge end, and
  iv. a transport length between the hinge end and tow end, which is
  v. at least twice as long as the tilt length,
a goose neck towing hitch on the transport platform at the front tow end,
g. a tilt hinge connecting the tilt platform hinge end to the transport platform hinge end, so that the self-loading transport has two positions called
  i. the transport position and
  ii. the upright tilt position,
h. said tilt surface and said transport surface at the same level at the tilt hinge when in the transport position, j. wheel struts pivotably mounted to the transport platform near the rear end of the transport platform, k. ground engaging wheels journaled to said wheel struts, l. remote controlled brakes for said wheels, m. an arcuate rocker attached to the tilt platform, n. said rocker extending from near the wheel carrying struts to the back end of the tilt platform, o. a ground engaging spike mounted on the rocker near the struts, and p. a tilt pitman extending from each of the struts to the rocker near the back end of the tilt platform.

13. The invention as defined in claim 12 further comprising:

q. wherein said transport is so constructed and arranged that the transport platform is supported with the rear above the front thus sloping the transport surface down toward the front hitch end.

r. the tilt platform in the transport position sloping down from the back end at a steeper slope than the transport platform, and s. a wheel brace extending from each of the struts to the transport platform in the transport position.

14. The invention as defined in claim 13 further comprising:

t. a frame on said transport platform, u. at least two trays forming the transport surface, w. said trays pivoted to the frame, and x. a latch holding the trays at level position.

15. The method of loading round hay bales upon a transport platform comprising:

a. pivoting a tilt platform to a transport platform, b. pivoting wheel struts to the transport platform, c. tilting the tilt platform to an upright position by moving the transport platform rearwardly, d. also rotating the wheel struts upward by moving the transport platform rearwardly, e. capturing the round bale onto the tilt platform, f. raising and leveling the tilt platform with the round bale restrained thereon by moving the transport platform forward, g. also rotating the wheel struts downward by moving the transport platform forward, h. releasing the round bale from the tilt platform, i. further tilting the tilt platform by further moving the transport platform forward until the tilt platform slopes toward the transport platform, and j. rolling the round bale from the tilt platform onto the transport platform.

16. The invention as defined in claim 15 further comprising:

k. transporting the hay on the transport platform to a location remote from where loaded, and l. unloading the hay from the transport platform.

17. The invention as defined in claim 15 further comprising, after tilting the tilt platform to an upright position then k. moving the transport platform and the tilt platform toward the bale, thus l. moving a fork on the tilt platform under the bale thereby performing the above recited capture step.

18. The invention as defined in claim 15 further comprising:

k. sloping the transport platform so that it slopes from one end to the other, and l. rolling the first bale loaded from the high end to the low end of the transport platform, and m. rolling each successive bale loaded from the high end to adjacent the previously loaded round bale.

19. The invention as defined in claim 18 further comprising, after tilting the tilt platform to an upright position then n. moving the transport platform and the tilt platform toward the bale, thus o. moving a fork on the tilt platform under the bale thereby performing the above recited capture step.

20. The invention as defined in claim 19 further comprising:

p. transporting the hay on the transport platform to a location remote from where loaded, and q. unloading the hay from the transport platform.

* * * * *